March 7, 1950     O. BRUMMER     2,499,353
UNITARY SEAL DEVICE
Filed Nov. 1, 1945     2 Sheets-Sheet 1
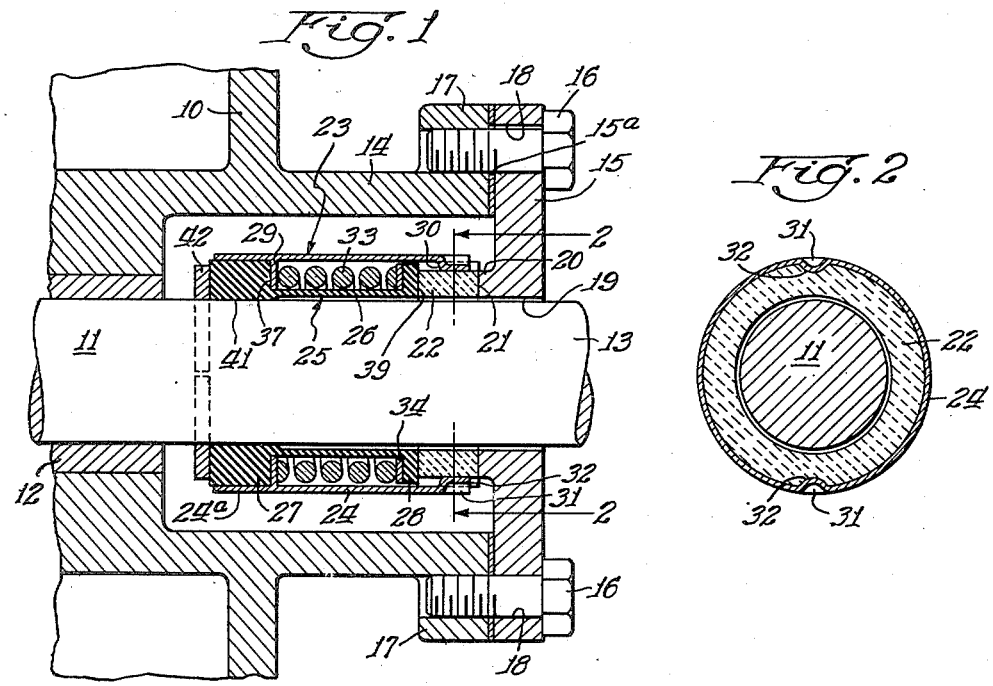
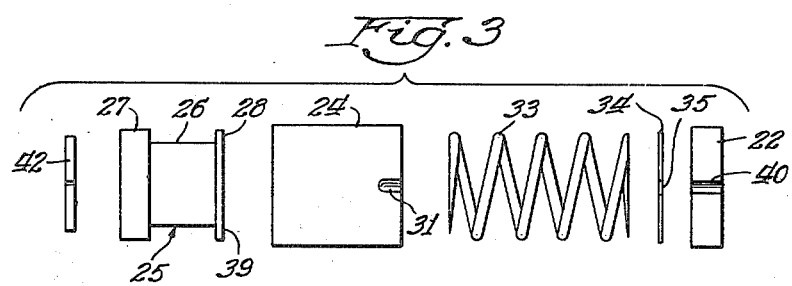
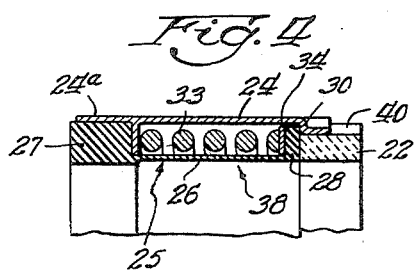
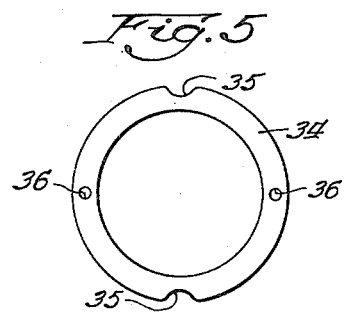
Inventor:
Olin Brummer
By: A. Trevor Jones March 7, 1950 — O. BRUMMER — 2,499,353
UNITARY SEAL DEVICE
Filed Nov. 1, 1945 — 2 Sheets-Sheet 2

Inventor:
Olin Brummer
By A. Trevor Jones
Atty.

Patented Mar. 7, 1950

2,499,353

UNITED STATES PATENT OFFICE 2,499,353

UNITARY SEAL DEVICE

Olin Brummer, Oak Park, Ill.

Application November 1, 1945, Serial No. 626,095

5 Claims. (Cl. 286—11)

This invention relates to a unitary seal device for a running shaft to prevent the escape or leakage of a fluid in the vicinity of the bearings of the shaft and more particularly where the seal grips the shaft at one end and where such running shafts are employed in installations involving high pressures and heavy duty, in which case a seal device of this class must resist both distortion and wear while at the same time functioning without interruption or minimized efficiency under variations of operating conditions and without the need for frequent inspection or maintenance of the device.

Moreover, it is highly desirable that a seal device for this purpose be one which can be installed on the shaft in such apparatus both originally and for replacement purposes when necessary with a minimum of knowledge or skill on the part of the mechanic making the installation and in substantially predetermined position so as to eliminate danger of incorrect installation.

Still further, it is very advantageous if such a seal device be capable of being produced and marketed as a pre-assembled self-contained non-exploding unit, with strong and well-balanced spring means included therein already under compression and thus being pre-loaded so to speak even before its installation in the apparatus and thus minimizing both the handling of separate parts and saving time in installation while effecting an enhanced sealing function throughout a long, uninterrupted operative life.

These and other objects and advantages will be apparent from the following description, taken together with the accompanying drawings, of illustrative embodiments of the invention, in which drawings—

Figure 1 is an enlarged sectional view showing an embodiment of the device of the present invention applied to a shaft;

Figure 2 is a cross-sectional view taken on the line 2—2 of Figure 1;

Figure 3 is a separated or so-called exploded view in side elevation and reduced somewhat in size with respect to Figures 1 and 2, of illustrative component parts of the device;

Figure 4 is an assembled view on the scale of Figure 1 of the unitary pre-loaded and non-exploding seal device of the present invention before installation;

Figure 5 is a front view of the retainer or loading ring in Figures 1, 3 and 4;

Figure 6:
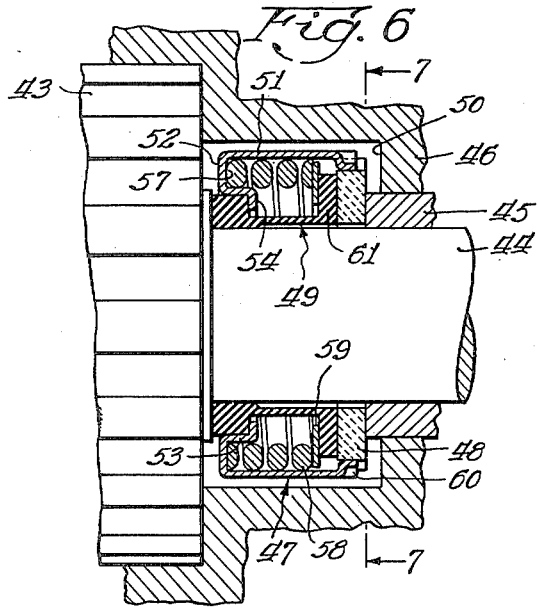
Figure 6 is a modified form of the device and shown in use somewhat similarly to Figure 1.
Figure 7:
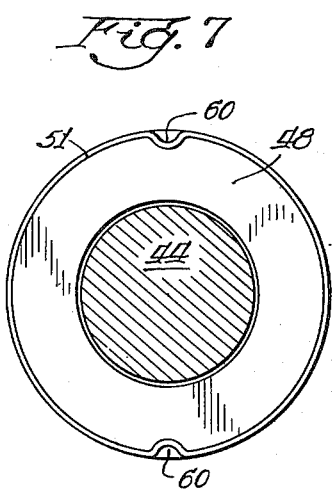
Figure 7 is a cross-sectional view on the line 7—7 of Figure 1.

Describing in detail an illustrative construction shown in the drawings and referring first to Figures 1 to 5, the numeral 10 may represent a portion of the casing of an apparatus in which the shaft 11 is intended to rotate, as in a bushing 12, and the shaft having a portion 13 which is required to extend outwardly beyond the casing, it being desired to prevent the escape or leakage of lubricant or other fluid, as for example a gas in mechanical refrigeration apparatus, about the periphery of the shaft 11 in the vicinity of the shaft portion 13 which extends outwardly of and in this instance to the right of the bushing 12. In one form, a gland cup 14 is provided on casing 10 through which the shaft projects, this gland cup being closed by a gland cap 15 secured to the end of the gland cup as by screw-bolts 16 received in ears 17 on the gland cup and passing through the bolt perforations 18 in the gland cap, a gasket 15a making a fluid-tight joint. The gland cap has the central perforation 19 through which the shaft portion 13 projects and has an internal annular boss 20 surrounding the perforation 19 and adapted to have seated thereagainst, as by a closely ground, running frictional fit at 21, a sealing disc or thrust washer 22 commonly formed of carbon or other anti-friction or refractory material, of a low coefficient of friction and capable of making a fluid-tight joint with the lapped face of the boss 20.

In accordance with the present invention, the sealing function is performed by the device indicated generally by the numeral 23 to which the invention is directed and which cooperates for this purpose with the shaft 11 and thrust washer 22 as next described.

The device 23 in its component parts in this instance comprises, as here shown, a metallic shell or housing 24 which is adapted to receive therewithin a body or boot 25 of rubberlike material, for example preferably one of the synthetic elastomers such as "neoprene" which has suitable qualities of flexibility and resilience while resisting the deteriorating influences arising from the action of chemicals, gases, water, air, light, heat, cold and the like. It will be understood that the housing 24 and the body 25 are annular and the body 25 has as here shown a central tubular part 26 and radially enlarged portions 27 and 28 at each end thereof. Within the housing are a pair of axially spaced apart abutments here represented by the numerals 29 and 30, Figure 1. In this instance the abutment 29 is in the form of an internal annular flange extending radially within the housing, while the abutment 30, of which there are here shown two such abutments on diametrically opposite sides of the housing, is in the form of a staking 31 on the exterior of the housing which forms a key 32 interiorly thereof, the shoulder formed at the inner end of this key providing the abutment 30.

A coil spring 33 is received under compression within the housing, this coil spring desirably having more than the minimum number of turns and at least four turns so as to effect a well-balanced distribution of spring pressure. The spring 33, as clearly shown in Fig. 3, before insertion in the housing 24 desirably has an axial length substantially greater than the length of the housing.

Before entering the rubber-like body 25 and spring 33 into the housing, the stakings 31 may be made, and the spring then inserted with one end of the spring contacting the internal flange abutment 29 in the housing. The flange 29 and stakings 31 hold the spring in the housing under compression, the normal length of the expanded spring, as seen in Figure 3, being substantially greater than its partially compressed or preloaded length as seen in Figure 1.

After the insertion of the spring and the making of the stakings just described, a metallic retainer or loading ring 34 is advantageously introduced at the end adjoining the abutment 30. This retainer ring 34, as best seen in Figure 5, is here shown diametrically oppositely notched as at 35 to register or correspond with the keys 32 formed by the stakings 31. Also, at other diametrical points as at 36, the retainer ring 34 may have tool engaging formations such as the holes 36 in which a tool may be located to rotate the retainer ring after it has been inserted in the housing past the keys 32, and thereby moving the notches 35 out of register with the keys 32 and locking the retainer ring and pre-loaded spring within the housing until it is desired to remove or explode them by again rotating the retainer ring to place the notches 35 in register with the keys 32.

After the insertion of the spring and retainer ring in the housing the rubber-like body 25 may be manipulated thereinto. It will here be noted that, as shown in the present embodiment, one of the enlarged portions 27 of the body is not only radially enlarged with respect to the central tubular part 26 but is also slightly smaller in internal diameter than the said central tubular part and the other radially enlarged part 28, and furthermore is also axially enlarged as compared with the other radially enlarged portion 28, so that the part 27 grips the shaft while the parts 26 and 28 are free from contact with the shaft. Thus the body enlarged portion 27 is relatively more rigid than the rest of the body, the tubular part 26 and radially enlarged part 28 being relatively more flexible or limber. By inserting the body through the left-hand end of the housing, the flexible tubular part 26 and radially enlarged portion 28 may be first crumpled somewhat or collapsed to be passed further into the housing while the radially and axially enlarged body portion 27 remains in the left-hand end of the housing, abutting at its inner annular face as at 37 the internal flange abutment 29, but remaining on the outside of this flange against which on its inner side the spring 33 presses. Thus the abutment 29 is between the spring and the enlarged body portion 27. The housing rear end 24a acts somewhat as a confining sleeve for the body portion 27.

As, now, the more flexible end of the body is worked into position, the retainer ring 34 may be pushed away from engagement with the housing abutments 30 sufficiently to permit the flange-like radially enlarged body portion 28 to be received annularly between the outer face of the retainer ring 34 and the housing abutments 30. When this is done and the spring 33 expanded to press the radially enlarged body part 28 into contact with the housing abutments 30, through the intermediation of the retainer ring 34, the central tubular part 26 of the body is then desirably stretched or under tension as at 38 (Fig. 4), the unstretched length of the body 25 being, as seen in Figure 1 such that when the body is not distended and is without folds or corrugations therein the body enlarged part 28 is spaced substantially inwardly of the abutments 30, as in Figure 1.

The assembled condition of the device before being placed into use is indicated in Figure 4 and such assembly commonly includes the otherwise conventional sealing disc or thrust washer 22 already referred to. This washer is arranged to abut the face 39 of the rubber-like body portion 28 and make a fluid-tight joint therewith and may conveniently have a pair of notches 40 in its periphery corresponding to the notches 35 in the retainer ring 34 and likewise registering with the keys 32 in the housing to provide that the washer 22 will rotate with the shell or housing 24 while being axially slidable therein, the housing 24 and body 25 also rotating therewith. The thrust washer 22 is of sufficient axial length so that it may be received in the ends of the housing contiguous to the keys 32 and be held thereby against relative rotation with respect to the housing while at the same time projecting therefrom at the right-hand end of the latter so as to abut the boss 20 of the gland cap 15 as already described.

When the unitary seal device 23 thus illustrated in Figure 4 is placed in position for use on the shaft 11 as indicated in Figure 1, this is of course done with the gland cap 15 removed. The device 23 is then pressed onto the shaft, the internal diameter of the shaft-gripping portion 27 of the seal device as at 41 being preferably such that the device must be forced onto the shaft with the aid of a lubricant and when thus located as shown in Figure 1, the body tends to stay in position where placed and an effective seal is provided along the shaft at 41, this being one of the annular places at which the seal is effected, and the other annular places being the annular meeting faces of the body flanged end 28, and washer 22, at 39, and thrust washer 22 and boss 20 at 21, these latter sealing surfaces being at right angles to the shaft.

If desired, to assist in locating the device 23 in proper position on the shaft and at the proper distance from the boss 20, a locating collar 42 in the form of a spring ring may be first pressed onto the shaft to abut the end of the body 25 at the left-hand end thereof.

It will be understood that the locating collar 42 is so positioned that when the device 23 is moved onto the shaft 11 into contact with the collar, the device 23 at this time carrying with it the thrust washer 22, the gland cap 15 is then fastened in position as by the screw bolts 16. Thereupon, the thrust washer 22 is forced inwardly with respect to the housing 24, pushing with it, at its inner end, the body enlarged portion 28 and the retainer ring 34 and thereby further compressing the spring 33, but still leaving some further compression of the spring possible.

The device is now in position to function, and at this time, as already explained, the stretch or tension is taken out of the tubular part 26 of the body, which is now undistended while at the same time being advantageously without folds or corrugations.

The device thus accommodates axial or canting movements of the shaft 11 with respect to the casing 10 while still maintaining the seal at the points 21 and 41 under all conditions. Also, it will be understood that frictional wear occurs at the point 21, since the device 23 and thrust washer 22 turn with the shaft 11 while the boss 20 remains stationary, and, as wear occurs at this point and the washer 22 becomes thinner, the spring 33 will expand and with it the body tubular part 26 to take up such wear, the retainer ring 34 and body enlarged portion 28 then moving to the right in Figure 1 toward the abutment 30 and reducing the space therebetween.

The spring 33 desirably acts to compress the body portion 27 further upon the shaft and is assisted in this by the locating collar 42 and the confining sleeve portion 24a of the housing.

Figure 8:
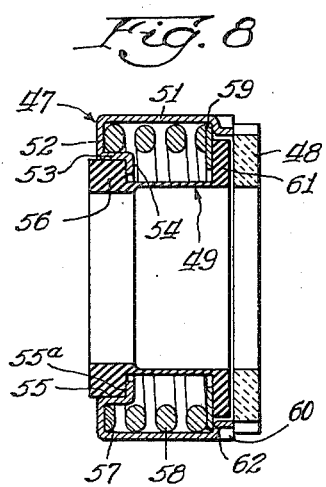
Figure 8 is an assembled view of the device shown in Figure 6 but before installation.
Figure 9:
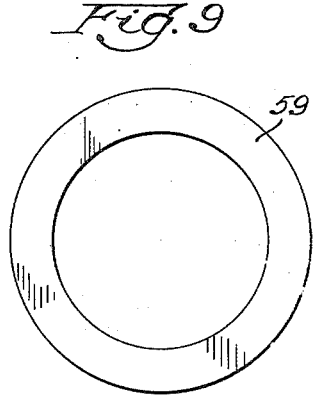
Figure 9 is a front view of the retainer or loading ring shown in Figures 6 and 8.

Turning now to Figures 6 to 9 inclusive, which show a modified form of the device, these views, and particularly Figure 6 may depict the application of the device to an apparatus such as a high power pump having a rotatory pumping element 43 keyed to a shaft 44 which turns in a bearing 45 in a pump casing 46. Here the device 47 following the present invention may be constructed as shown, Figure 8 showing the device assembled together wtih the thrust washer 48 but before being placed into its operating position shown in Figure 6. In this modification, the body or boot of rubber-like material 49 is substantially similar to that of the body 25 of the earlier figures, but is of slightly less relative axial length.

To accommodate a smaller axial space for the device as at 50 (Fig. 6) the housing 51 is also of relatively less axial length and is advantageously turned in upon itself at its left-hand end as at 52 and then extended inwardly axially at 53 and then turned radially inwardly again as at 54, to provide both a seat as at 55 and abutment 55a for the body axially and radially enlarged portion 56 and also a well formation or abutment as at 57 to receive one end, that is, the left-hand end, of the spring 58. In this instance, the spring, to accommodate the smaller axial length of the device, may have fewer turns but still at least desirably three complete turns as shown.

The device of Figures 6 to 9 inclusive may be actually of several times the dimensions of that of Figures 1 to 5, and it may be desirable to permanently lock the spring 58 therein after once being assembled in pre-loaded condition so as to avoid possible injury to any one handling the device by an explosion of the parts. Accordingly, the retainer ring 59 is made in this instance without notches in its periphery and is located in the housing 51 against the right-hand end of the spring 58 with the latter under compression before the stakings 60 are made in the housing. Thus, when these stakings 60 are made, as shown, the spring and retainer ring are permanently locked in the housing.

The rubber-like body 49 may then be manipulated into position somewhat as already described with reference to the previous views, but, in this instance, the radially enlarged portion 61 of the body may be of smaller radial dimension than the retainer ring 59 and thus the retainer ring engages the abutments 62 formed by the inner ends of the stakings 60 directly and not through the intermediation of the rubber-like enlarged portion as in Figure 4.

In other respects the device of Figures 6 to 9 inclusive follows the structure and mode of operation of the device already described with reference to Figures 1 to 5 inclusive, and in each case, a unitary pre-loaded non-exploding seal device of enhanced efficiency is provided.

It is to be understood that the invention is not limited to details of construction here shown for purposes of exemplification and that such changes may be made as fall within the scope of the appended claims without departing from the invention.

The invention having been described, what is here claimed is:

1. A unitary annular seal device, comprising, in combination, a housing, a coil spring compressed within the housing, a body of rubber-like material within the spring having a central tubular part and radially enlarged portions at each end and adapted to expand and contract axially of the housing with the expansion and contraction of said spring, one of said body enlarged portions being of smaller internal diameter than the other and axial abutments for the spring at each end of the housing retaining the spring within the housing, one of said abutments being between the spring and the enlarged portion which is of smaller internal diameter, and the spring pressing the other of said body enlarged portions outwardly of the housing.

2. The structure of claim 1 wherein the body enlarged portion of smaller internal diameter is axially aligned with said spring and with the last mentioned abutment.

3. The structure of claim 1 wherein the body enlarged portion of a smaller internal diameter is radally aligned with a coil of said spring and the last mentioned abtument is offset axially inwardly of the housing where it abuts said body enlarged portion of smaller internal diameter.

4. In a unitary seal device, in combination, a cylindrical shell, a coil spring having a length along the axis of its coils when uncompressed substantially greater than the length of said shell, circumferentially spaced inwardly directed formations in said shell adjacent one end thereof, a loading ring slidingly fitting in said shell, said formations limiting sliding movement of the ring outwardly of the shell, an annular axially expansible and contractible sealing member in said shell having at one end a radial enlargement disposed in axial engagement with and outwardly of said ring, an axial abutment in the other end of the shell, said coil spring being compressed between said loading ring and said abutment and urging the ring and sealing member enlargement outwardly of the shell but not pressing upon the sealing member at the other end of the shell.

5. In a unitary seal device, in combination, a cylindrical shell, a coil spring having a length along the axis of its coils when initially uncompressed substantially greater than the length of the said shell and having at least four complete convolutions in its coils, circumferentially spaced inwardly directed formations carried by said shell adjacent one end thereof, a loading ring slidingly fitting in said shell, said formations limiting sliding movement of the ring outwardly of the shell, an axial abutment in the other end of the shell, said coil spring being compressed between said loading ring and said abutment and urging the ring outwardly of the shell limited by said formations, and a tubular axially expansible and compressible sealing member in said shell, said sealing member having at one end a radial enlargement disposed in axial engagement with and outwardly of said ring and having its other end in sealing engagement with the shell.

OLIN BRUMMER.

REFERENCES CITED

The following references are of record in the file of this patent:

UNITED STATES PATENTS

| Number | Name | Date |
|---|---|---|
| 2,333,624 | Magnesen | Mar. 4, 1941 |
| 2,249,930 | Bailey et al. | July 22, 1941 |
| 2,365,351 | Matter | Dec. 19, 1944 |
| 2,469,846 | Roth et al. | May 10, 1949 |

FOREIGN PATENTS

| Number | Country | Date |
|---|---|---|
| 664,854 | France | of 1929 |